United States Patent [19]

Nagase

[11] Patent Number: 4,600,956

[45] Date of Patent: Jul. 15, 1986

[54] ROTARY HEAD ASSEMBLY FOR USE IN A TAPE RECORDING/REPRODUCING APPARATUS

[75] Inventor: Tetsuo Nagase, Tokorozawa, Japan

[73] Assignee: Pioneer Electronic Corporation, Tokyo, Japan

[21] Appl. No.: 702,846

[22] Filed: Feb. 19, 1985

Related U.S. Application Data

[63] Continuation of Ser. No. 628,973, Jul. 10, 1984, abandoned, which is a continuation of Ser. No. 383,171, May 28, 1982, abandoned.

[30] Foreign Application Priority Data

May 29, 1981 [JP] Japan ............................ 56-077624[U]

[51] Int. Cl.⁴ .............................................. G11B 5/55
[52] U.S. Cl. ..................................................... 360/106
[58] Field of Search ..................... 360/106, 96.6, 96.5, 360/71, 78, 137

[56] References Cited

U.S. PATENT DOCUMENTS 4,302,788  11/1981  Yamamoto ..................... 360/106 X
4,510,543   4/1985  Ohta ................................. 360/106

Primary Examiner—A. J. Heinz

[57] ABSTRACT

A rotary head assembly for use in a tape recording/reproducing apparatus. The rotary head assembly comprises a head base, a drum holder affixed to the head base, a recording/reproducing head, a head carrying drum, a sector gear pivotably mounted to said drum holder, a slide member mounted on the head base for sliding movement, and means for interlocking said slide member with said sector gear. The head carrying drum is rotatably received in a cylindrical bore formed in the drum holder and carries the recording/reproducing head at one end and a coaxial gear at the other end. The sector gear is arranged to mesh with the coaxial gear. The slide member is slidingly moved to pivot the sector gear through the inter-locking means a sufficient angle to rotate the gear on the head carrying drum an angle of substantially 180 degrees in response to the reversal of the recording/reproducing operation between the forward and the reverse directions.

4 Claims, 5 Drawing Figures

ROTARY HEAD ASSEMBLY FOR USE IN A TAPE RECORDING/REPRODUCING APPARATUS

This application is a continuation of application Ser. No. 628,973, filed July 10, 1984, now abandoned, which in turn is a continuation of Ser. No. 383,171, filed May 28, 1982, and now abandoned.

BACKGROUND OF THE INVENTION

This invention relates to an improvement in a rotary head assembly for use in magnetic tape recording/reproducing apparatus.

In prior art tape recording/reproducing apparatus capable of performing recording/reproducing operation in both the forward and reverse directions, the recording/reproducing head was moved up and down transverse to the path of a tape depending on the direction of operation. Such linear movement of a head often results in an error in azimuth between the forward and reverse directions, failing to perform acceptable recording/reproducing operation in both the directions.

Rotary head assemblies were recently developed wherein the head was rotated an angle of substantially 180 degrees to provide more precise azimuth adjustment. The applicant developed one exemplary rotary head assembly in which a head carrying drum is rotatably received in a bore in a drum holder which is fixedly secured to a head base. The drum holder consists of two segments which define a cylindrical bore therebetween when mated. The bore and the head carrying drum are provided with a circumferential channel and strip for mutual engagement. The assembly may be completed by placing the head carrying drum between the opposed holder segments and securing together the segments by means of screws or bolts. Then the head carrying drum is supported in the bore in the holder such that the drum is allowed for rotation about its axis, but prevented from axial movement through the channel-strip engagement. This assembly has some disadvantages that assembly is cumbersome and time-consuming because the drum holder is divided into two segments, and that the snug fit of the drum in the bore is not always ensured because of manufacturing tolerance. A complicated mechanism for rotating the head and somewhat inaccurate operation thereof constitute further shortcomings.

It is, therefore, an object of this invention to provide a rotary head assembly for use in a tape recording/reproducing apparatus which uses a single-piece drum holder for rotatably receiving a head carrying drum and a separate retainer instead of the channel-strip engagement for retaining the head carrying drum to prevent the axial movement thereof.

Another object of this invention is to provide a rotary head assembly for a tape recording/reproducing apparatus which is of a simple structure and can operate in a stable manner.

SUMMARY OF THE INVENTION

According to this invention, there is provided a rotary head assembly for use in a tape recording/reproducing apparatus, comprising a head base adapted to advance to a position for recording/reproducing operation, a recording/reproducing head, a cylindrical head-carrying drum having the recording/reproducing head at one end, and a drum holder affixed to the head base and having a cylindrical bore formed therein for rotatably receiving the head carrying drum. A gear is substantially coaxially fixed to the other end of the head carrying drum. A sector gear is pivotably mounted to the drum holder and arranged to mesh with the gear. A slide member is mounted on the head base for sliding movement in one or the other direction and interlocked with the sector gear by suitable means. When the recording/reproducing operation is reversed from the forward to the reverse direction or vice versa, the slide member is slidingly moved to one direction to pivot the sector gear through the interlocking means a sufficient angle to rotate the gear, and hence, the head carrying drum an angle of substantially 180 degrees. Retaining means is in snug fit on the drum holder for preventing the axial movement of the head carrying drum. The retainer has a pair of lugs spaced a distance equal to the length of the head carrying drum so that the head carrying drum is held between the lugs.

In the preferred embodiment of this invention, the interlocking means includes a pair of tracks formed on the slide member and a pair of stops on the sector gear. In addition, a spring is connected between a pin on the slide member and another pin on the sector gear. One of the tracks abuts and forces the corresponding stop to pivot the sector gear over at least a half of its pivotal angle and the spring assists in further driving the sector gear to the corresponding position when the slide member is slidingly moved in one direction in response to the reversal of operational direction.

BRIEF DESCRIPTION OF THE DRAWINGS

The above and other objects, features and advantages of this invention will be more fully understood from the following description taken in conjunction with the accompanying drawings, in which.

DESCRIPTION OF THE PREFERRED EMBODIMENTS

Figure 1:
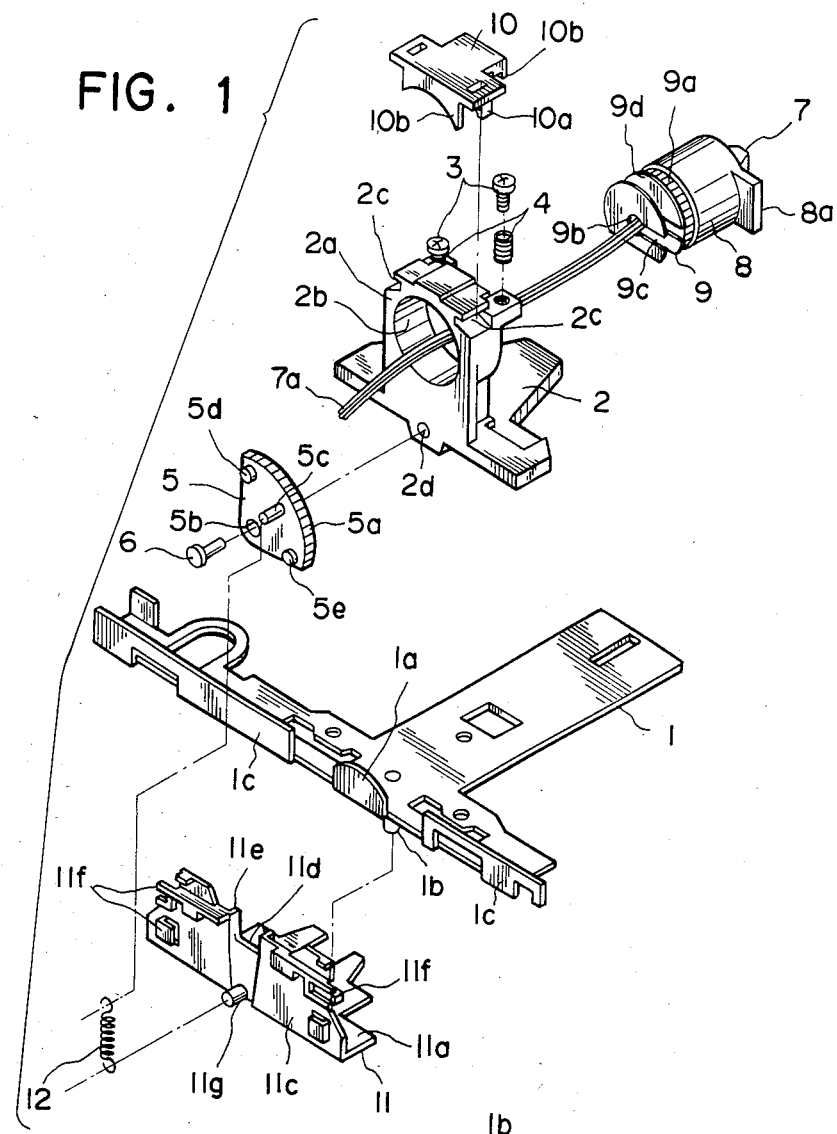
FIG. 1 is an exploded perspective view of one embodiment of the rotary head assembly of this invention.
Figure 3:
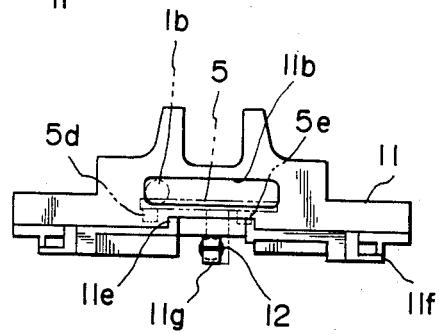
FIG. 3 is a plan view of a slide member shown in FIG. 1.

Referring to the drawings, the numeral 1 designates a head base upon which the rotary head assembly of this invention is mounted. A drum holder 2 is secured to the head base 1 by means of screws. The drum holder 2 includes a vertical member 2a, in which substantially cylindrical bore 2b is formed for receiving therein a cylindrical head carrying drum 8. The vertical member 2a is provided with a pair of opposed recesses 2c on the upper end. A drum retainer 10, which will be described in detail later, is seated on the top of the vertical member 2a to snugly fit therewith through the engaging recesses. Further, the vertical member 2a is drilled with a hole 2d in the lower center to receive a pivot 6. A pair of adjustable azimuth screws 3 each surrounded by a spring 4 are threadably engaged into brackets projecting from the vertical member 2a. A sector gear 5 with a toothed portion 5a along the circumferential segment is provided with bore 5b near the center and a pair of spaced stops 5d and 5e at the circumferentially opposed ends. A spring engaging pin 5c is also secured to the sector wheel 5 between the stops. The pivot 6 is inserted into the hole 2d in the drum holder 2 through the bore 5b in the sector gear 5. Accordingly, with the pivot 6 inserted into the holder hole 2d, the drum holder 2 is mounted in place on the head base 1 so that a center vertical section 1a of the head base 1 abuts against the head of the pivot 6 to prevent removal of the pivot.

A recording/reproducing head 7 is attached to one end (front end) of a head carrying drum 8 which is rotatably received in the bore 2b in the drum holder 2. The head carrying drum 8 is formed at one end with a stop tab 8a which is adapted to abut against one of the azimuth adjustment screws 3 to thereby position the head carrying drum and hence, the head at the proper azimuth when the drum 8 is rotated substantially 180°. A guide member 9 is attached in a spaced apart relation to the other end (rear end) of the head carrying drum 8, and provided along its circumference with a toothed portion 9a. This guide member 9 includes a central hole 9b, a slot 9c radially extending from the central hole, and a winding section 9d for the purpose of guiding a lead 7a electrically connected to the head 7. The drum retainer 10 is affixed to the top of the vertical member 2a. To secure the drum retainer 10 to the drum holder 2, the retainer is provided with a pair of locking pawls 10a extending downward from the both ends for engagement with the corresponding recesses 2c in the vertical member 2a. The drum retainer 10 is also formed with a pair of lugs 10b also extending downward from its front and rear ends. When the drum retainer is seated on the drum holder, these lugs 10b lie in front of and behind the head carrying drum 8 in the drum holder bore 2b to thereby prevent the drum from axial movement. In assembling, after the head carrying drum 8 has been inserted into the drum bore 2b in the drum holder 2, the drum retainer 10 is pressed against the top of the drum holder 2 to bring the locking pawls 10a into snug fit with the respective recesses 2c. At the same time, the lugs 10b lie in contact with the both end surfaces of the head carrying drum 8. In this way, the head carrying drum 8 received in the drum holder 2 is prevented from axial movement in the holder bore by the lugs 10b of the drum retainer 10, but is allowed for rotation about its axis.

Figure 2:
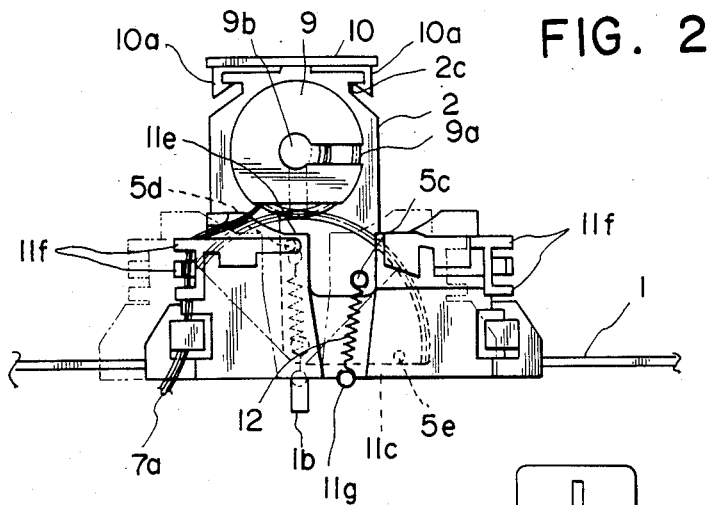
FIG. 2 is an elevational view of the assembly of FIG. 1 when viewed from the rear.
Figure 4:
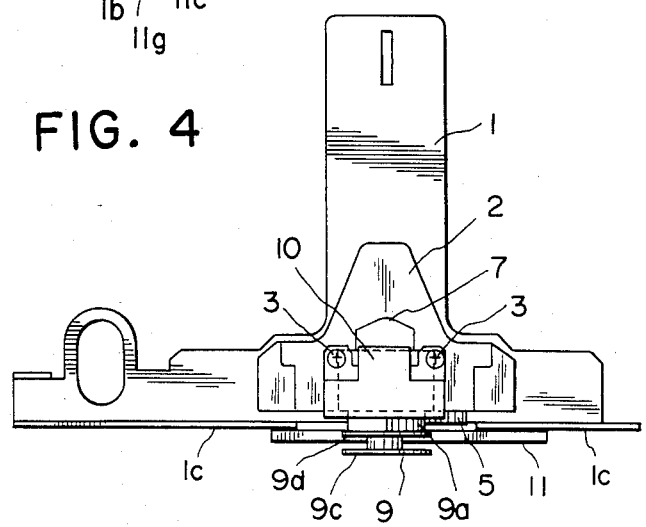
FIG. 4 is a plan view of the assembly of FIG. 2.
Figure 5:
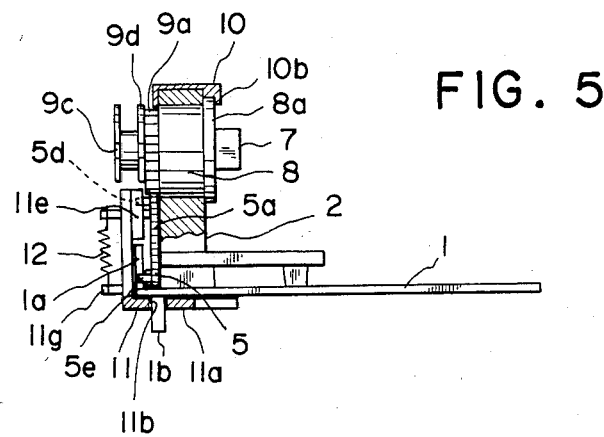
FIG. 5 is a partially cut-away side view of the assembly of FIG. 2.

A slide member 11 is disposed adjacent the head base for sliding movement and adapted to move laterally each time when recording or reproducing operation is reversed into the forward or reverse direction. To control the movement of the slide member, the head base 1 is formed on its bottom with a guide pin 1b. A horizontal plate 11a made integral with and extending from the slide member is provided with a longitudinal guide slot 11b through which the guide pin 1b of the head base extends. A pair of end vertical sections 1c and the aforesaid center vertical section 1a at the rear end of the head base 1 also serves to guide the slide. A vertical section 11c is made integral with the slide and is formed with a recess 11d through which the spring engaging pin 5c of the sector gear 5 projects. A provision is made for interlocking the slide member 11 with the sector gear 5. A pair of inclined tracks 11e are formed at opposite sides of the recess 11d in the slide member 11. As the slide 11 moves laterally, one of the tracks contacts the corresponding one of the stops 5d, 5e on the sector gear 5 to rotate the sector gear 5. These tracks 11e control the rotation of the sector gear 5 in either direction as the slide member 11 moves laterally for the required operation. The slide member is also provided with a plurality of fingers 11f on both sides of the vertical section 11c for guiding and engaging the lead 7a. The lead 7a extending from the head 7 is wound around the winding section 9d, extended through the fingers 11f, and then connected to the electric circuit of the tape player. The slide member 11 is also provided with an engaging pin 11g in the middle. Between the engaging pin 11g and the pin 5c on the sector gear 5 is connected a spring 12 which acts to keep the sector gear 5 unmovable at either of the two positions corresponding to the forward and reverse operations. In FIG. 2 the sector gear 5 is illustrated in broken line as being kept at the right position as a result of clockwise rotation. In addition, this spring 12 serves to hold the slide member 11 against the center and side vertical sections 1a and 1c so as to prevent, the slide member 11 from moving away from the head base 1 during operation.

Since the system of the present invention has so far been explained, operation thereof will now be described.

In the figures, the head 7 of the rotary head assembly is shown in the position for recording or reproducing operation in the forward direction, and the head carrying drum 8 has thrust its stop tab 8a against the tip of the azimuth adjustment screw 3 on the right hand (in the drawings). With the head in this position, actuation of the tape player for recording or reproducing operation causes the head base 1 to advance to bring the head in contact with a tape (not shown).

When the direction of travel of the tape is changed from the forward to the reverse direction by means of a sensor (not shown) which can sense the tape end or by manual switch-over by the user during the forward operation, the head base 1 is retracted and the slide member 11 is moved leftward (in the drawings). This leftward movement of the slid member 11 causes the sector gear 5 to rotate counterclockwise against the force of the spring 12 through the engagement of the track 11e with the stop 5d on the sector gear 5. In the course of this rotation of the sector gear, after the pin 5c has passed the mid point where the spring 12 has just undergone the maximum expansion, the sector gear 5 is forceably rotated in instant by the action of the spring 12. The rotation of the sector gear 5 is transmitted to the guide member 9 since the gear 9a of the guide member 9 is in mesh with the toothed portion 5a on the sector gear. The guide member 9, and hence the head carrying drum 8 is rotated clockwise in the drum holder until the stop tab 8a abuts against the tip of the azimuth adjustment screw 3 on the left side (in the drawings). In this way, the head 7 is rotated 180 degrees and set in position for recording or reproducing operation in the reverse direction. To add for clarity, the interruption of the head carrying drum 8 will also bring the sector gear 5 to a stop. It is to be noted that the spring 12 is expanded to a relatively less extent even when the pin 5c is at the mid pivot, because the slide member and sector gear are moved together.

As the lead 7a extending from the head 7 is wound on the winding section 9d of the guide member 9 and then extended through the fingers 11f on the slide 11, lead 7a is unlikely to interfere or entangle with other components during rotation of the head carrying drum 8.

After the head 7 has been rotated to the reverse position, the head base 1 advances to the playback position to bring the head 7 into contact with the tape to provide for recording or reproducing operation.

The head assembly may be changed from the reverse to the forward position in a similar manner except that movement of the components is opposite.

In the head assembly for tape players constructed in accordance with the present invention, a head carrying drum equipped with a recording/reproducing head is rotatably disposed in a substantially cylindrical bore in a one-piece drum holder. In assembly, the head carrying drum is first inserted into the bore of the drum holder. On top of the drum holder is seated a drum retainer for preventing the head carrying drum from axial movement relative to the drum holder. The drum holder has on its upper sides a pair of grooves or flanges with which a pair of matching flanges or grooves formed on the drum retainer are engaged to secure the drum retainer to the drum holder. This method of assembly makes it possible to produce a rotary head assembly in a simple manner. The fact that the drum holder is made of one piece will add far more to mechanical precision than in conventional drum holders of the split type. Also, rotational movement of the head carrying drum within the drum holder can be smooth because of simplicity in design.

In the preferred head assembly according to the present invention, a head carrying drum is rotatably disposed in a drum holder affixed stationary to a head base. A sector gear is in mesh with a gear affixed to the head carring drum for rotation of the head carrying drum and hence the head an angle of 180 degrees when the operating direction is reversed. This rotation of the sector gear is caused by means of a slide member which is slid along the head base. A spring is provided to interlock the slide member with the sector gear. The main function of this spring is to urge the sector gear in its rotation to either of the positions for the forward and reverse operations and to hold the sector gear in place. In this arrangement, the expansion of the spring involved in the operation of the rotary head assembly is relatively less than that required in a similar system where a spring is connected to the head base. Therefore, a spring of less tension and smaller size can be employed. This spring also serves to hold the slide member against the head base in a stable manner.

What is claimed is:

1. A rotary head assembly for use in a tape recording-/reproducing apparatus, comprising,
    a head base adapted to be advanced for recording and reproducing operations,
    a drum holder affixed to said head base and having a cylindrical bore formed therein,
    a head carrying drum rotatably received in said cylindrical bore in said drum holder and carrying at a first axial end a recording/reproducing head, and at a second axial end a gear substantially coaxially fixed thereto,
    a sector gear pivotally mounted on said drum holder and arranged to mesh with said gear,
    a pair of spaced stops on said sector gear at circumferentially opposite ends thereof,
    a first engaging pin on said sector gear between said spaced stops,
    a slide member mounted on said head base for sliding movement lateral with respect to an axial direction of the head carrying drum, said slide member having a cut-out portion through which said first engaging pin projects,
    a second engaging pin on said slide member,
    a pair of inclined tracks formed on opposite sides of said cut-out portion such that said tracks extend between said spaced stops and said tracks can each abut a respective stop, and
    a spring extended between said first engaging pin and said second engaging pin, whereby a sliding movement of the slide member in response to a reversal of the recording/reproducing operation is transmitted to said sector gear, to pivot the sector gear, by abutment of a track with its respective stop and by said spring, so as to effect substantially a 180° rotation of said head carrying drum in said drum holder.

2. A rotary head assembly as claimed in claim 1, further comprising, retaining means associated with said drum holder for preventing axial movement of said head carrying drum relative to said drum holder.

3. A rotary head assembly as claimed in claim 2, wherein said retaining means comprises a retainer snugly fitted on said drum holder and having a pair of lugs spaced a distance equal to the length of said head carrying drum, whereby said head carrying drum is held between the lugs to prevent axial movement thereof, while permitting rotation of the drum about its axis.

4. A rotary head assembly as claimed in claim 3, wherein said retainer has a pair of pawls adapted to snugly engage a corresponding pair of recesses in said drum holder.

* * * * *